Figure 1:
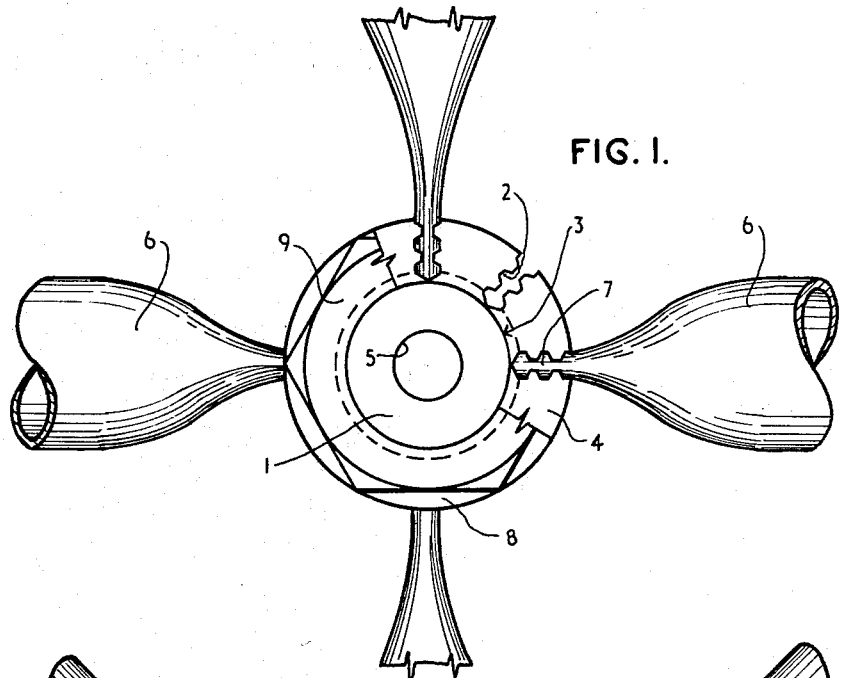

Sept. 27, 1966     A. E. FENTIMAN     3,275,351

SEPARABLE JOINT

Filed Feb. 20, 1964

INVENTOR
ARTHUR E. FENTIMAN

ATTORNEY

United States Patent Office 3,275,351
Patented Sept. 27, 1966

3,275,351
SEPARABLE JOINT
Arthur E. Fentiman, Stittsville, Ontario, Canada, assignor to Triodetic Structures Limited, Ottawa, Ontario, Canada
Filed Feb. 20, 1964, Ser. No. 346,291
1 Claim. (Cl. 287—54)

This invention relates to improvements in a separable joint, such as would be suitable for use in the construction of space frames, walls and/or parts of buildings, engineering structures, assemblies of a wide variety and the like. It represents a further development in or a continuation of the inventions disclosed in Patents 2,931,467 "Structural Framework"; 2,964,147 "Truss and Components Therefor"; 2,976,968 "Wall Construction"; 2,916,109 "Reinforced Wall Construction"; 2,895,753 "Joint"; and 3,099,681 "Method of Making a Joint."

The present invention appertains particularly to a novel load-transmitting coupling comprising a simplified connector with separable arms engaged therewith and secured against accidental displacement therefrom.

It is an object of this invention to provide a joint embodying a keyway-type connector having integral, nut-carrying threaded ends.

A further object of the invention is to provide an improved and simplified method of making such a joint connector.

A further object of the invention is to provide a joint embodying a connector having an integral threaded stud on one end surrounded by a washer-nesting recess.

A further object of the invention is to provide a joint having a keyway-type connector with integral nut-receiving ends and an annular recess of conical cross-section at one end with a complementary tapered washer nested therein.

A still further object of the invention is to provide a joint of the nature and for the purpose described that can be mass produced at reasonable cost, easily and quickly assembled with a minimum af labour and the employment of the simplest of tools, will remain secure against accidental separation and meet all requirements of such a connection, whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings, and pointed out in the claim hereunto appended.

The invention will be best understood and can be more clearly described when reference is had to the drawings forming a part of this disclosure wherein like characters indicate like parts throughout the several views.

Figure 2:
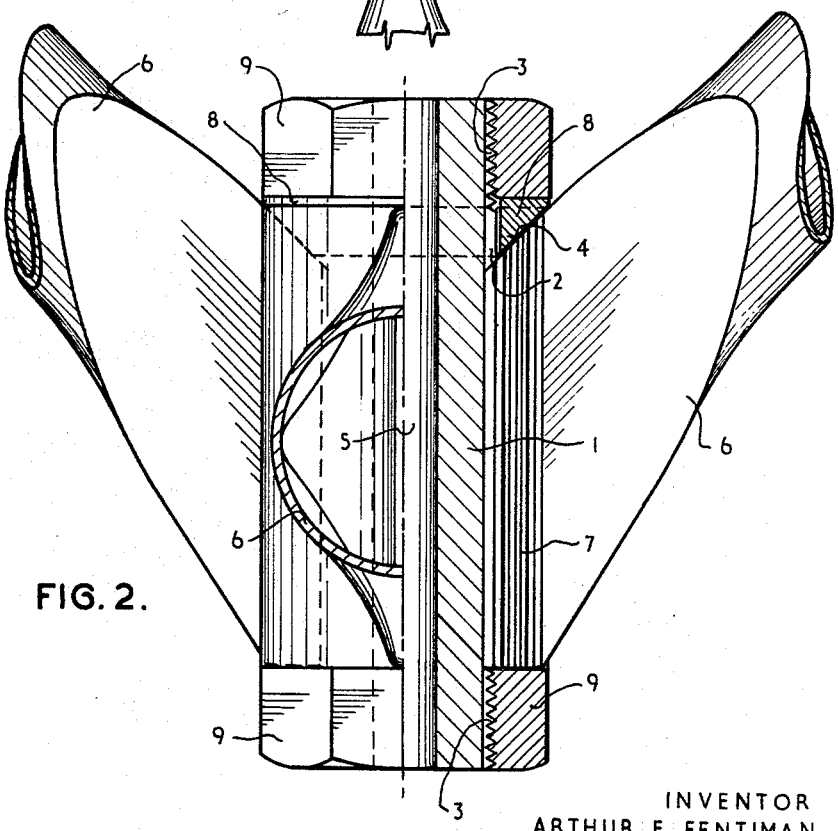

In the drawings:

FIGURE 1 is a plan view of a preferred embodiment of the joint, with part of the top nut broken away; and FIGURE 2 is a side elevation thereof, partly in section.

In Patent 2,931,467 "Structural Framework," a keyway hub is shown that utilizes a bolt passing axially through the hub and provided with a coacting nut to secure washers against opposite ends of the hub. Similarly, Patent 2,964,147 shows a keyway-type connector hub that utilizes a coaxial nut and bolt assembly. In this most recent invention the loose extraneous bolt is dispensed with and the hub, or connector, is fashioned with integral threaded studs on opposite ends. The present design of connector lends itself to manufacture from pieces of desired length cut from an extrusion of aluminum or the like, pre-formed with such number, size and arrangement of longitudinal keyways as may be needed, a nut of an exterior diameter approximating the connector being applied to each stud and effectively closing the opposite ends of the connector keyways.

Radial arms or diverging members, whose keyed ends engage in the connector's keyways and are designed to resist sliding or even creeping in the connector, are nevertheless securely locked thereto by the large nuts applied to the integral threaded studs on opposite ends of the connector that effectively cover the open ends of the keyways. To snugly clamp the key ends in the connector, where the arms diverge at an angle to the connector's transversal, an annular trough or recess is provided in the end of the connector surrounding the threaded stud and a complementary tapered washer is nested therein.

Referring now particularly to the drawings, the numeral 1 designates the connector having a body portion of elongated form and circular cross-section. It could be of any suitable length and polygonal or geometrical cross-section. There are a plurality of circumferentially spaced, peripheral keyway slots 2 extending longitudinally thereof; the depth of the slots being about one-half the radius of the hub or approximately within the limits of 25%–70% of the radius.

On each end of the hub-like body there is a coaxial extension 3 of reduced diameter in the form of an integral exteriorly threaded stud and about the base of one such stud, which for purpose of orientation only I denominate the "upper" one, there is an annular recess 4 that is of conical cross-section as its outer wall is inclined at an angle within the approximate range of 30° to 60°.

An axial bore 5 extends through the connector hub 1 serving to reduce the weight or material thereof, aid in the assembly of the joint or for other desired purpose.

The structural members 6 employed with this keyway-type connector or hub or radial or divergent arms or the like and may be in the form of rods, bars, tubes or of any appropriate shape or design, with flattened tenons 7 on the ends thereof corresponding with and for engagement in the keyway slots 2. These flattened tenons or key ends 7 of the structural elements may be inserted longitudinally in the keyway slots 2 of the connector hubs from either open end, as may be appropriate or convenient. Where the structural member or arm 6 is to diverge from the hub at other than at right angles to the axis of the connector, the end of the member and the tenon keys thereon are disposed diagonally at say 30°, 45° or 60° to the longitudinal axis of the rod or tube. In such a case, as shown clearly in FIGURE 2, the lower end or farthermost tip of the tenon may be trimmed off while engaging the upper side of the tenon, whose angle corresponds substantially and lies substantially flush with the inclined outer wall of the annular recess 4 in the upper end of the connector 1, a tapered washer 8 is provided that nests loosely in the recess. The washer is also slightly thicker than the depth of the recess so as to project above the wall thereof, i.e., it rises above the upper end of the hub body per se.

A suitable nut 9 is screwed on each stud 3, being of an exterior measurement approximating the diameter of the connector body thus completely overlying and effectively closing the opposite open ends of the keyways 2. The tenon ends 7 of the structural arms 6 are accordingly held captive and the components of the joint secured against any possibility of accidental separation. It will be noted also on reference to FIGURE 2 that the length of the body portion of the connector 1 is substantially the same as that of the keyed tenon 7 on the flattened end of the structural member or arm 6 so that when the nuts 9 are tightened on the threaded studs 3 on opposite ends of the connector they bear compressibly against upper and lower edges of the tenon in the connector keyway. Where a tapered washer 8 is employed, it rather than the upper nut actually engages the upper edge of the tenon.

In fabricating the connector 1, it is intended to utilize extruded rods of suitable cross-section, with the desired number and arrangement of circumferentially spaced, peripheral, radial keyway slots and to cut off pieces of the rod of the desired length. The opposite ends are then turned down to provide the coaxial studs of the proper reduced diameter and these are then threaded, one end of the connector body being countersunk to provide the annular recess of taper or conical cross-section concentric with the threaded stud. Similarly, the nuts can be cheaply and easily produced from an extruded rod of polygonal, e.g. hexagonal cross-section with an axial bore or porthole, the required lengths being chopped off and interiorly threaded to match the studs on the connector.

Though useable in a multitude of assemblies, an important application of this improved joint and connector is in the erection of space frames such as the two and three-way grids disclosed in Patents 2,976,968 "Wall Construction" and 2,916,109 "Reinforced Wall Construction."

From the foregoing description taken in connection with the accompanying drawings, it will be manifest that a separable joint is provided that will fulfil all the necessary requirements of such a device, but as many changes could be made in the above description and many apparently widely different embodiments of the invention may be constructed within the scope of the appended claim, without departing from the spirit or scope thereof, it is intended that all matters contained in the said accompanying specification and drawings shall be interpreted as illustrative and not in a limitative or restrictive sense.

What is claimed as new is:

A separable joint comprising a unitary hub-like connector having a hub of a given diameter with circumferentially spaced longitudinally extending peripheral keyway slots, an integral coaxial externally threaded stud of a diameter less than said given diameter on each end thereof and an annular countersunk recess of conical cross-section in one end of said larger diameter portion concentric with the stud and at the junction thereof with said larger diameter portion, structural members with flat keyed ends engaging in said keyways, a washer having a taper complementary to the taper of said recess loosely nested in said recess and embracing the stud at said one end, and a pair of nuts one on each stud overlying opposite ends of said keyway slots and securing the ends of said structural members in said connector against accidental displacement, one face of each structural member having a slope which is the same as the taper of the recess, one nut directly engaging the tapered washer to force the latter into the recess and against the structural members and the other nut directly contacting the structural members, and the axial extent of said washer being greater than the depth of said recess, said washer being so constructed as to bottom on the axial inner wall of said recess, said double nut and washer combination providing adjustable clamping means including overstress prevention.

References Cited by the Examiner

UNITED STATES PATENTS

| | | | |
|---|---|---|---|
| 140,895 | 7/1873 | Dawson | 248—188.7 |
| 2,657,455 | 11/1953 | Hillberg | 29—155 |
| 2,660,122 | 11/1953 | Landberg | 287—52.5 |
| 2,798,284 | 7/1957 | Mudd | 29—155 |
| 2,931,467 | 4/1960 | Fentiman. | |
| 3,073,395 | 1/1963 | Duncan | 170—173 X |
| 3,119,633 | 1/1964 | Greuet | 287—54 |
| 3,129,965 | 4/1964 | Stark | 287—54 |
| 3,151,830 | 10/1964 | Giacomi | 248—188.7 |

FOREIGN PATENTS

| | | |
|---|---|---|
| 722,310 | 7/1942 | Germany. |
| 885,704 | 12/1961 | Great Britain. |

CARL W. TOMLIN, *Primary Examiner.*

I. B. TALTON, T. A. LISLE, *Assistant Examiners.*